US012583334B2

(12) United States Patent
Palakonda et al.

(10) Patent No.: US 12,583,334 B2
(45) Date of Patent: Mar. 24, 2026

(54) SYSTEMS AND METHODS TO PREDICT AND APPLY REGENERATIVE BRAKING

(71) Applicant: Ford Global Technologies, LLC, Dearborn, MI (US)

(72) Inventors: Sathyanarayana Chary Palakonda, Northville, MI (US); Brennan Hamilton, Birmingham, MI (US)

( * ) Notice: Subject to any disclaimer, the term of this patent is extended or adjusted under 35 U.S.C. 154(b) by 304 days.

(21) Appl. No.: 18/333,070

(22) Filed: Jun. 12, 2023

(65) Prior Publication Data

US 2024/0408975 A1 Dec. 12, 2024

(51) Int. Cl.
*G06F 17/00* (2019.01)
*B60L 7/18* (2006.01)
*B60L 15/20* (2006.01)
*B60L 15/30* (2006.01)

(52) U.S. Cl.
CPC .............. *B60L 15/2045* (2013.01); *B60L 7/18* (2013.01); *B60L 15/30* (2013.01); *B60L 2240/622* (2013.01); *B60L 2240/70* (2013.01); *B60L 2250/16* (2013.01); *B60L 2250/28* (2013.01); *B60L 2260/26* (2013.01)

(58) Field of Classification Search
CPC ........ B60L 15/2045; B60L 7/18; B60L 15/30; B60L 2240/622; B60L 2240/70; B60L 2250/16; B60L 2250/28; B60L 2260/26; B60L 2240/642; B60L 7/10; G01C 21/165; G01C 21/28; G01C 21/3476; G01S 19/47
USPC .......................................................... 701/22
See application file for complete search history.

(56) References Cited

U.S. PATENT DOCUMENTS

| | | | |
|---|---|---|---|
| 8,423,273 B2 | 4/2013 | Mineta | |
| 9,157,756 B2 * | 10/2015 | Mason | G06Q 10/063112 |
| 10,525,848 B2 * | 1/2020 | Nelson | G01C 21/3415 |
| 11,016,712 B2 | 5/2021 | Chengalvala et al. | |
| 2010/0324752 A1 * | 12/2010 | Suganuma | B60W 40/076 701/1 |
| 2011/0238457 A1 * | 9/2011 | Mason | G06Q 10/063112 705/7.14 |

(Continued)

FOREIGN PATENT DOCUMENTS

WO 2022092647 A1 5/2022

OTHER PUBLICATIONS

Optimal-Electric-Vehicles-Route-Planning-with-Traffic-Flow-Prediction (Year: 2022).*

(Continued)

*Primary Examiner* — Ronnie M Mancho
(74) *Attorney, Agent, or Firm* — Emily Campbell; Eversheds Sutherland (US) LLP

(57) ABSTRACT

Systems and methods to predict and apply regenerative braking using GPS (global positioning system) and IMU (inertial measurement unit) data. Techniques described herein may be utilized to use a vehicle's current GPS position and IMU sensor data to determine charging availability for electric or hybrid vehicles. IMU and/or GPS data is used to determine a next path prediction and detect next route elevation level. If the next route elevation level is above a threshold, value, the vehicle's motor may be automatically swapped for regenerating energy. Accordingly, recharging operations may be performed in a wide change of scenarios, including those where a driver has not engaged the brake pedal.

17 Claims, 4 Drawing Sheets

(56)  References Cited

U.S. PATENT DOCUMENTS

| | | | | |
|---|---|---|---|---|
| 2015/0088414 A1* | 3/2015 | Mason | ............... | G01C 21/3484 |
| | | | | 701/423 |
| 2016/0258770 A1* | 9/2016 | Mason | ............. | G06Q 10/06311 |
| 2020/0122601 A1* | 4/2020 | Nelson | ................... | G01C 21/34 |
| 2021/0107372 A1* | 4/2021 | Viswanathan | .......... | B60L 53/62 |
| 2021/0302183 A1 | 9/2021 | Mendes et al. | | |
| 2022/0196418 A1 | 6/2022 | Wray et al. | | |
| 2022/0227248 A1* | 7/2022 | Viswanathan | .......... | B60L 53/30 |
| 2023/0241995 A1* | 8/2023 | Viswanathan | .......... | B60L 53/30 |
| | | | | 320/105 |

OTHER PUBLICATIONS

Liang Li, et al., Energy Recovery Strategy for Regenerative Braking System of Intelligent Four-Wheel Independent Drive Electric Vehicles, IET Intelligent Transport Systems, Wiley, Dec. 7, 2020, 119-131.

* cited by examiner

SYSTEMS AND METHODS TO PREDICT AND APPLY REGENERATIVE BRAKING

BACKGROUND

Regenerative braking is an energy recovery mechanism that slows down a moving vehicle or object by converting its kinetic energy into electrical energy. Hybrid/electric vehicles may include electric circuitry configured to convert kinetic energy into electrical energy via a regenerative operation when an electrical motor is used in reverse. The electrical motor functions as a generator and converts mechanical energy into electrical energy, transferring mechanical energy from the wheels to an electrical load. Typically, a vehicle may apply regenerative braking when a driver engages the vehicle's brake pedal.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
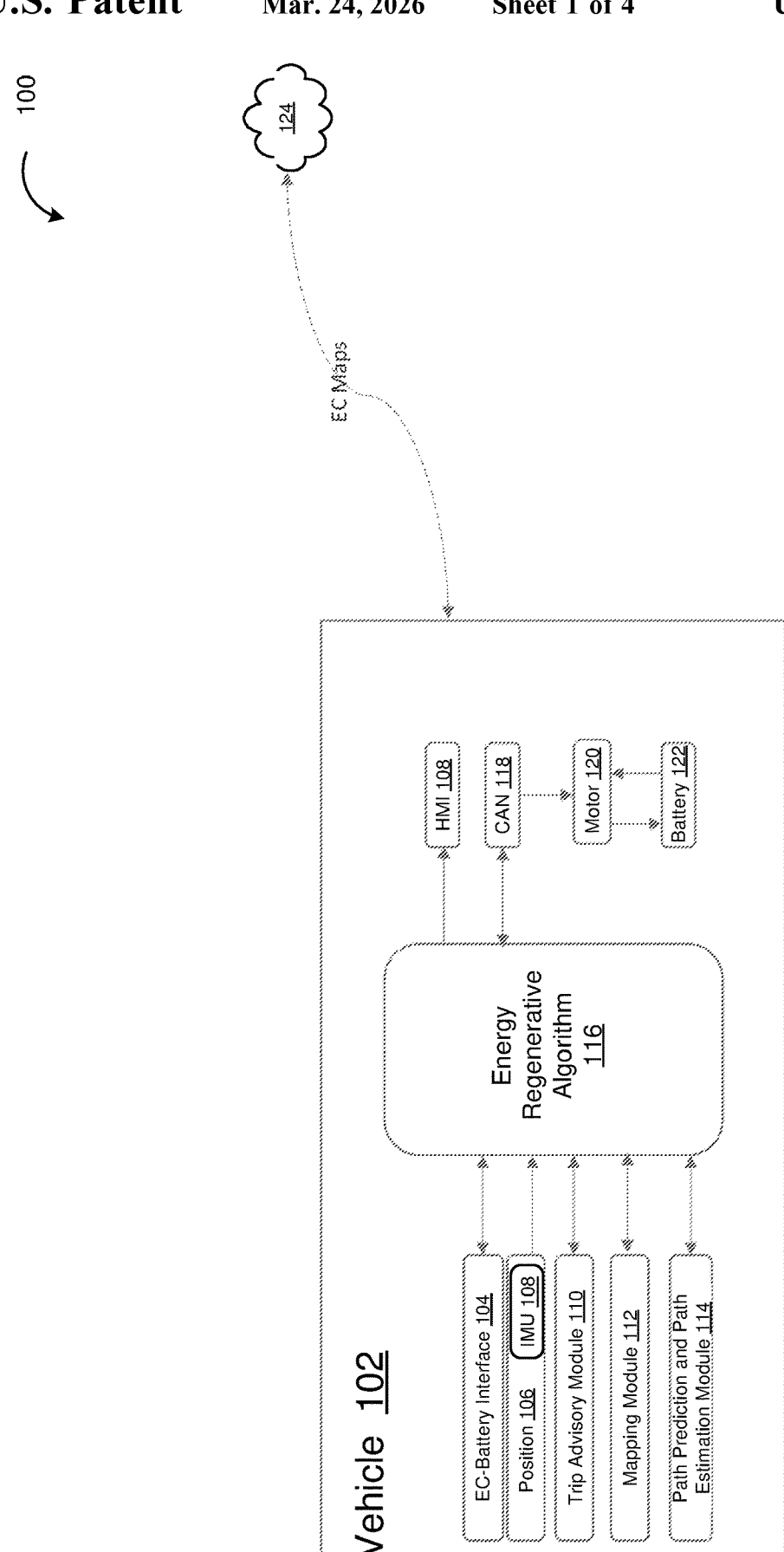
FIG. 1 illustrates a diagram in which a vehicle is configured to implement techniques to predict and apply regenerative braking, according to at least one embodiment of the present disclosure.

The present disclosure is directed to systems and methods to predict and apply regenerative braking using GPS (global positioning system) and IMU (inertial measurement unit) data. Techniques described herein may be utilized to increase the range of electrical/hybrid vehicles by performing recharge operations based at least in part on GPS and IMU data. Accordingly, it should be appreciated that the techniques described herein are not limited to instances where the vehicle is braking, and that regenerative operations may be performed even when a driver has not engaged a vehicle's brake pedal or other applied other friction-based braking systems.

Regenerative braking refers to an energy recovery mechanism that slows down a moving vehicle or object by converting its kinetic energy into electrical energy. Hybrid/electric vehicles may include electric circuitry configured to convert kinetic energy into electrical energy via a regenerative operation when an electrical motor is used in reverse. The electrical motor functions as a generator and converts mechanical energy into electrical energy, transferring mechanical energy from the wheels to an electrical load.

Electric vehicles have limited battery capacities and limited range. While a vehicle is in transit, various energy recovery mechanisms may be applied, such as regenerative braking, to increase the vehicle's range. However, there are many challenges involved in determining an appropriate strategy for regenerative braking. Accordingly, it should be appreciated that there is a present need for enhancements in a vehicle's ability to predict and apply regenerative braking across a wide variety of use cases.

In at least one embodiment, a vehicle (e.g., electrical vehicle) comprises an electronic control unit that implements an electrical advisory algorithm that predicts and applies regenerative braking based on GPS (global positioning system) and IMU (inertial measurement unit) sensor data on a known path. A known path may refer to pathing that is determined based on a user providing an input destination and selecting a desired navigation route to the destination. In various embodiments, the electrical advisory algorithm will turn on when vehicle ignition ON and communications EC battery module over CAN and will update HMI with current charging available percentage.

When a user selects a destination to travel, a trip advisory algorithm or module will detect multiple stopping points and best energy saving route and also updates an energy regenerative algorithm or module. The energy regenerative algorithm or module may be used to identify the best elevation points and best short paths from an available routes list and updates the electrical advisory algorithm or module. The electrical advisory algorithm or module may display the best routes with respect on a human-machine interface (HMI) mapping software.

Best routes may be determined according to various criteria, such as fuel efficiency, toll avoidance, regenerative charging, and so on and so forth. In various embodiments, the user selects a destination location on the vehicle's maps interface. The electrical advisory algorithm or module may then calculate the route distance, utilizing previous driving history (e.g., average mileage and speed etc.) data. The electrical advisory algorithm or module may calculate and advise the user with current available charging and show whether the vehicle can reach the destination or not. In various embodiments, best EC driven route and driving pattern can be suggested or shared by uploading route to a remote server (e.g., a cloud service) such that it can be shared to other vehicles for energy saving and reproducing routes while driving. The remote server may be a cloud service or service provider that collects route information for the best regenerative charging routes and can collect the information, analyze it based on individual drivers' habits, and generate recommendations that can be shared to other vehicles for energy saving and reproducing routes while driving.

The electrical advisory algorithm or module will monitor the charging availability (e.g., every second) and calculate the distance the vehicle can travel. Due to driving pattern changes, if a vehicle can no longer reach the destination, the electrical advisory algorithm or module will notify the driver of such change.

In various embodiments, techniques for predicting and applying regenerative braking are performed while the vehicle is driving an energy regenerative route. An energy regenerative route may comprise one or more regenerative locations that are determined by an energy regenerative algorithm or module that identifies elevation locations from selected maps using the vehicle's GPS location and/or IMU sensor data to alert the motor to swap the motor direction to regenerate energy. If the vehicle's accelerator is not engaged, the motor direction is reversed at the regenerative locations and regenerating braking is engaged, even when the vehicle's friction-based brakes are not engaged (e.g., the driver is neither pressing the vehicle's accelerator pedal nor the vehicle's brake pedal).

In various embodiments, once a vehicle reaches the elevation point in a selected path, the energy regenerative algorithm or module will predict the next path elevation. If the elevation path is above a threshold value, the regenerative algorithm or module will send a signal to the charging module to swap the motor direction to regenerate the energy.

In various embodiments, the motor module swaps the direction of the motor and the vehicle will engage a regenerative charging operation. The energy regenerative algorithm or module may continue to monitor the vehicle's GPS current position and the vehicle's IMU sensor data to determine whether the predicted next path elevation remains above the threshold. If so, the vehicle may continue to perform the regenerative charging operation. If, at any point, the vehicle's accelerator is engaged, the motor module will swap the motor direction to engage forward propulsion of the vehicle.

In various embodiments, the regenerative algorithm or module will update the HMI with how much energy is regenerated while driving.

In various embodiments, data regarding the utilization of regenerative charging is recorded when the user is driving without a known route. For example, when a user is driving without the aid of a mapping module to provide navigation instructions, the vehicle's electronic systems may record the next driving route path inferred by the path estimation algorithm and/or the actual driving route that is ultimately taken. Regenerative charging data-for example, how much regenerative charging was achieved-may be recorded for the actual driving route. Some or all of the recorded data is transmitted to a remote server (e.g., cloud service) that can then use the recorded data to perform machine learning and enhance the path estimation algorithm regenerative charging estimations, calculations of best charging routes, and so on and so forth.

Accordingly, by utilizing these techniques, a vehicle can be recharged while driving without user interaction or disturbances while the vehicle is being driven on a known path.

In at least one embodiment, a vehicle (e.g., electrical vehicle) comprises an electronic control unit that implements an electrical advisory algorithm that predicts and applies regenerative braking based on GPS (global positioning system) and IMU (inertial measurement unit) data sensor data without a known path (e.g., navigation instructions have not been provided) or during typical non-guided travel. In various embodiments, the electrical advisory algorithm will turn on when vehicle ignition ON and communications EC battery module over CAN (control area network) and will update HMI with current charging available percentage.

In various embodiments, the electrical advisory algorithm or module monitors the charging availability on a regular basis (e.g., every second) and calculates the distances that the vehicle can travel and updates the HMI with such information, which can be presented to the user of the vehicle.

In various embodiments, the energy regenerative algorithm or module receives GPS position and IMU data and monitors every position elevation. Once the vehicle reaches an elevation point, the energy regenerative algorithm or module estimates the next path elevation using path estimation module. If the elevation path is above a threshold, the regenerative algorithm or module will send a signal to the charging module to swap the motor direction to regenerate the energy. In various embodiments, the energy regenerative algorithm or module will use a path estimation algorithm for the next driving route. When the motor module swaps directions, the vehicle will start charging (energy regeneration) until the user accelerates the vehicle. Accordingly, with the techniques described herein, the vehicle will be able to recharge while driving without user interaction or disturbances.

According to one embodiment of the present disclosure, a vehicle comprises one or more processors coupled to one or more memories that store computer-readable instructions that, when executed by the one or more processors, cause the one or more processors to implement functionality to predict and apply regenerative braking when a destination is known (e.g., provided by the user to a mapping module). The functionality may be implemented to determine a destination selected by a user of the vehicle; determine, based on the destination, one or more candidate routes; determine elevation points for each of the one or more candidate routes; select, from the one or more candidate routes and based on the elevation points, a regenerative charging route; determine, using GPS (global positioning system) and IMU (inertial measurement unit) information, that the vehicle is traveling on the regenerative charging route; determine that the vehicle has reached an elevation point of the regenerative charging route; determine next route elevation path is above a threshold value; and swap direction of a motor of the vehicle to initiate regenerative charging of a battery of the vehicle.

According to one embodiment of the present disclosure, a vehicle will determine, based on the regenerative charging route, one or more stopping points.

According to one embodiment of the present disclosure, a vehicle will determine that the user has pressed an accelerator pedal of the vehicle; and swap the direction of the motor of the vehicle to initiate acceleration of the vehicle.

According to one embodiment of the present disclosure, a vehicle will display how much energy was generated on a HMI (human-machine interface) of the vehicle.

According to one embodiment of the present disclosure, a vehicle determine, prior to switching the direction of the motor, that an accelerator pedal of the vehicle is not engaged.

According to one embodiment of the present disclosure, the regenerative charging of the battery is initiated independent of the user engaging the vehicle's brake pedal. In other words, regenerative charging may be performed even when friction-based braking systems of the vehicle are not engaged. For example, if the vehicle is traveling on a portion of road that is at a slight decline, the user may not feel that engaging the brake pedal is necessary, and regenerative braking may nevertheless be initiated.

According to one embodiment of the present disclosure, a vehicle will calculate charging percentage of the vehicle on the regenerative charging route. In various embodiments, the vehicle will upload the regenerative charging route to a remote server.

According to one embodiment of the present disclosure, a vehicle comprises one or more processors coupled to one or more memories that store computer-readable instructions that, when executed by the one or more processors, cause the one or more processors to implement functionality to predict and apply regenerative braking when the user is driving without having provided a known destination to the vehicle (e.g., destination has not been provided by the user to a mapping module). The functionality may be implemented to determine, using GPS (global positioning system) and IMU (inertial measurement unit) information, when the vehicle has reached an elevation point; determine, using a path estimation algorithm a next driving route for the vehicle; determine next route elevation path is above a threshold value; and swap direction of a motor of the vehicle to initiate regenerative charging of a battery of the vehicle.

According to one embodiment of the present disclosure, the vehicle will determine that a user has pressed an accelerator pedal of the vehicle; and swap the direction of the motor of the vehicle to initiate acceleration of the vehicle.

According to one embodiment of the present disclosure, the regenerative charging of the battery is initiated independent of a user engaging the vehicle's brake pedal.

According to one embodiment of the present disclosure, the vehicle will display how much energy was generated on a HMI (human-machine interface) of the vehicle.

According to one embodiment of the present disclosure, the vehicle will determine, prior to switching the direction of the motor, that an accelerator pedal of the vehicle is not engaged.

According to one embodiment of the present disclosure, the vehicle will calculate charging percentage of the vehicle.

Referring to FIG. 1, FIG. 1 illustrates a diagram 100 in which a vehicle 102 is configured to implement techniques to predict and apply regenerative braking, according to at least one embodiment of the present disclosure.

FIG. 1 depicts a vehicle 102 according to one or more embodiments of the present disclosure. Vehicle 102 of FIG. 1 comprises EC-battery interface 104, position 106, HMI 108, trip advisory module 110, mapping module 112, path prediction and path estimation module 114, energy regenerative algorithm 116, CAN 118, motor 120, and battery 122. Vehicle 102 may be implemented in the context of FIG. 2 or other embodiments described throughout this disclosure.

In various embodiments, one or more of the vehicle components depicted in FIG. 1 may be implemented by one or more processors coupled to one or more memories that store computer-readable instructions that, when executed by the one or more processors, implement various functionality, including the ability to predict and apply regenerative braking for vehicle 102 in a wide variety of situations, including those where the user has not engaged the vehicle's brake pedal.

EC-battery interface 104 may refer to software and/or hardware components of vehicle 102 that may be utilized by energy regenerative algorithm 116 to provide information regarding the vehicle's battery state, such as the current charging available percentage. In various embodiments, energy regenerative algorithm 116 communicates with EC-battery interface 104 over CAN 118 and updates HMI 108 to present the vehicle's current charging available percentage.

Position 106 refers to a positioning system according to various embodiments. Position 106 may refer to a vehicle's GPS receiver system that determines the vehicle's latitude, longitude, and elevation. Position 106 may comprise IMU 126 (inertial measurement unit). IMU 126 may be implemented using electronic circuitry that measures and reports the vehicle's specific force, angular velocity, and orientation using a combination of sensors such as accelerometers, gyroscopes, and magnetometers. The vehicle's geolocation may be presented to the user in HMI 108. The vehicle may provide the geolocation to the energy regenerative algorithm 116 to make determinations as to when to apply a regenerative charging operation.

Trip advisory module 110 may refer to software and/or hardware component of vehicle 102 that receives a destination selected by a user and determines the best route(s) for travel. The trip advisory algorithm may determine one or more best routes and provide them to the energy regenerative algorithm 116, which can be used to determine the best charging routes. The trip advisory module 110 may also be used to determine the best stopping points based on the best regenerative charging route. Trip advisory module 110 may detect multiple stopping points and best energy saving route and send updates to the energy regenerative algorithm 116.

Mapping module 112 may refer to software and/or hardware components of vehicle 102. A user of vehicle 102 may interact with the mapping module 112 to select a destination for travel. The mapping module may receive the user's desired destination information and provide it to the energy regenerative algorithm 116, trip advisory module 110, EC-advisory algorithm, or other components of vehicle 102 as needed.

Path prediction and path estimation module 114 may refer to software and/or hardware components of vehicle 102. Path prediction and path estimation module 114 may use a path estimation algorithm to determine the next driving route. Path prediction and path estimation module 114 may be used to predict the next path elevation when the vehicle reaches an elevation point in a selected or predicted path.

Energy regenerative algorithm 116 may refer to software and/or hardware components of vehicle 102. In various embodiments, energy regenerative algorithm digitally interacts with EC-battery interface 104, position 106, HMI 108, trip advisory module 110, mapping module 112, path prediction and path estimation module 114, or any suitable combination thereof. In various embodiments, a control area network (CAN 118) is used to interact with motor 120 and/or battery 122.

Energy regenerative algorithm 116 may receive geolocation information from mapping module 112 with destination information provided by a user. Energy regenerative algorithm 116 may receive one or more routes from trip advisory module 110 for reaching the desired destination. Energy regenerative algorithm 116 may determine, for the one or more routes, elevation points and determine, based on the elevation points, a best charging route. The best regenerative charging route may be provided by energy regenerative algorithm 116 to trip advisory module 110 and an electrical advisory algorithm. Energy regenerative algorithm 116 may monitor the vehicle's position (e.g., latitude, longitude, and elevation) while the vehicle 102 is in transit. Energy regenerative algorithm 116 may detect that the next route elevation level is above a threshold value and instruct the motor 120 to swap directions and start regenerative charging of the battery 122. Energy regenerative algorithm 116 may furthermore monitor the driving status of the vehicle so that if the accelerator is engaged, that regenerative charging is not performed. For example, if the vehicle has engaged regenerating charging and the driver subsequently engages the accelerator pedal, the motor direction may be changed to provide forward propulsion.

Energy regenerative algorithm 116 may operate while the vehicle is being driven even if destination information is not provided. Energy regenerative algorithm 116 may monitor the vehicle's position (e.g., latitude, longitude, and elevation). Energy regenerative algorithm 116 may determine, based on the current GPS position and the vehicle's IMU elevation data that the current location of the vehicle is above a threshold value and based at least in part on the estimated path. Energy regenerative algorithm 116 may receive IMU info that is used to estimate the next path prediction and detect next route elevation level. If it is above the threshold, then the motor may be alerted. Energy regenerative algorithm 116 may instruct the motor 120 to swap directions and start regenerative charging of the battery 122. Energy regenerative algorithm 116 may furthermore monitor the driving status of the vehicle so that if the accelerator is engaged, that regenerative charging is not performed. For example, if the vehicle has engaged regenerating charging and the driver subsequently engages the accelerator pedal, the motor direction may be changed to provide forward propulsion.

HMI 108 may refer to a suitable human-machine interface of vehicle 102, such as a touchscreen, for presenting graphical information to the user of vehicle 102. The HMI may be used to display information such as the best routes to a destination, how much energy is saved on a regenerative charging route, and so on and so forth.

CAN 118 (control area network) may be utilized by energy regenerative algorithm 116 to interact with motor 120 and/or battery 122. For example, energy regenerative algorithm 116 may provide commands or instructions to motor 120 to change the motor direction to enable regenerative charging. Energy regenerative algorithm 116 may use CAN 118 to determine the battery 122 percentage level and charging levels.

In various embodiments, motor 120 provides a driving force for the powertrain. Alternatively, the motor 120 may act as a generator and convert kinetic energy from the powertrain into electric energy to be stored in the battery 122. The motor 120 may act as a generator while the engine is providing propulsion power for the vehicle 102, for example. The motor 120 may additionally act as a generator during times of regenerative braking in which torque and rotational (or motive) energy or power from spinning wheels is transferred back through the gearbox, torque converter, (and/or torque converter bypass clutch) and is converted into electrical energy for storage in the battery. EC maps may be communicated to/from a cloud service 124 that vehicle 102 communicates with via a wireless connection. In various embodiments, the best EC route can be suggested or shared to other vehicles for energy saving and reproducing while driving.

It should be noted that the various interfaces, modules, algorithms, etc. depicted in FIG. 1 are shown as discrete components for illustrative purposes only. In various embodiments, some or all of the components depicted in FIG. 1 may be combined or separated to have varying levels of functionality as appropriate for a given use case.

Figure 2:
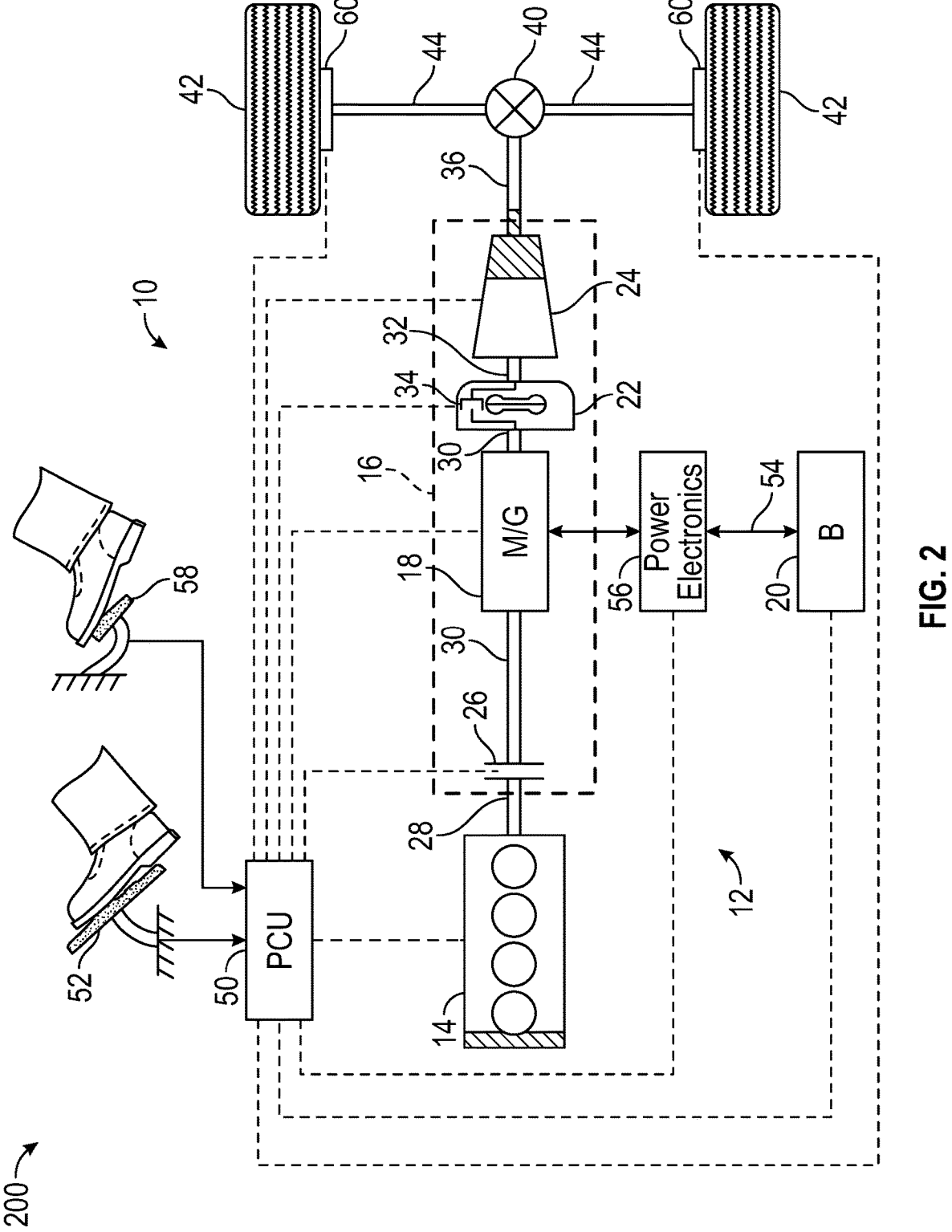
FIG. 2 depicts a schematic diagram of a hybrid electric vehicle (HEV), according to one or more embodiments of the present disclosure

Referring to FIG. 2, a schematic diagram of a hybrid electric vehicle (HEV) 10 is illustrated according to one or more embodiments of the present disclosure. FIG. 2 illustrates representative relationships among the components. Physical placement and orientation of the components within the vehicle may vary. The HEV 10 includes a powertrain 12. The powertrain 12 includes an engine 14 that drives a transmission 16. As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 2, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the HEV 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 2, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the HEV 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

It should be understood that the schematic illustrated in FIG. 2 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

It should be understood that the vehicle configuration described herein is merely exemplary and is not intended to be limited. Other electric or hybrid vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other electric or hybrid vehicle configuration known to a person of ordinary skill in the art.

During a regenerative braking operation where it is not desirable to further charge the battery 20 (e.g., where the battery 20 is fully charged), the regenerative braking energy may be directed to the electric heater 80 or to the refrigerant compressor 98 to respectively heat or cool the coolant within the coolant circuit 64. While the regenerative braking energy is being directed to operate either the electric heater 80 or the refrigerant compressor 98, the battery 20 may operate as a thermal battery to absorb the heat from the coolant within the coolant circuit 64 that is being generated by the electric heater 80 or to dissipate heat into the coolant within the coolant circuit 64 when the refrigerant compressor 98 is operating to cool the coolant. When the battery 20 is also operating as a thermal battery, it is important to maintain the battery temperature within a desirable range between a minimum and a maximum operating temperature, because if the temperature of the battery 20 is allowed to significantly increase or decrease outside of normal operating temperatures, the functionality (e.g., the ability of the battery to store a charge, the discharge power output limits of the battery, the discharge current limits of the battery, etc.) of the battery 20 deteriorates.

Figure 3:
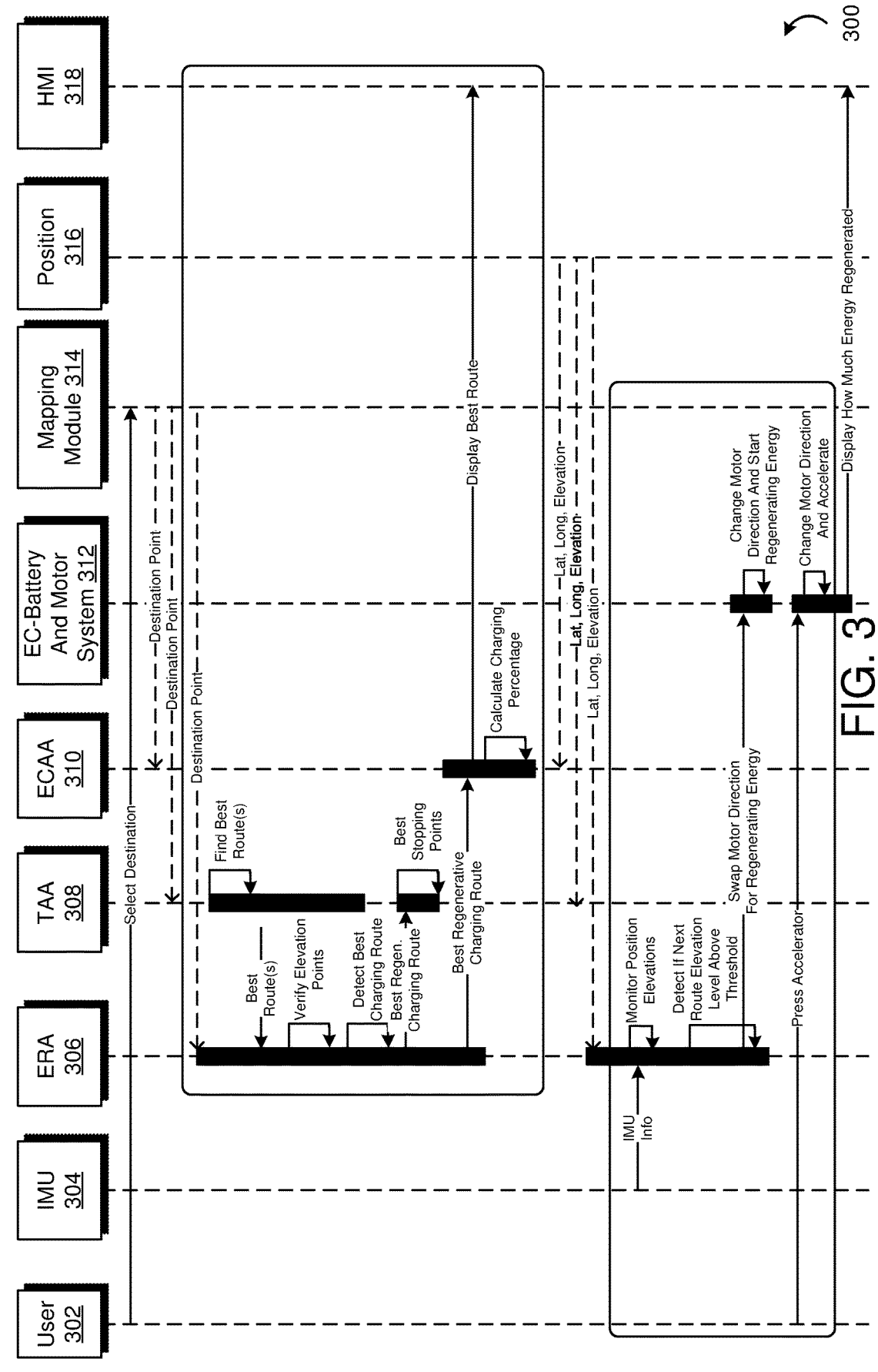
FIG. 3 depicts a diagram in which a vehicle predicts and applies regenerative braking on a known path, according to at least one embodiment of the present disclosure.

FIG. 3 depicts a diagram 300 in which a vehicle predicts and applies regenerative braking on a known path, according to at least one embodiment of the present disclosure.

FIG. 3 depicts an example embodiment comprising a user 302, IMU 304 (inertial measurement unit), ERA 306 (energy regenerative algorithm), TAA 308 (trip advisory algorithm), ECAA 310 (electrical advisory algorithm), EC-battery and motor system 312, mapping module 314, position 316, and HMI 318 (human-machine interface).

In at least one embodiment, a user 302 of a vehicle selects a destination using the mapping module 314. The user 302 may interact with a touchscreen or provide the instructions via HMI 318. Regardless, the destination may be provided to the mapping module 314 and the destination point may be provided to the ECAA 310, TAA 308, and ERA 306. In various embodiments, ECAA 310 calculates the current available charging and determines whether the vehicle has sufficient range to successfully reach the destination. In various embodiments, ECAA 310 may calculate and advise the user with current available charging and show whether the vehicle can reach the destination or not.

In various embodiments, the destination point is provided to TAA 308. TAA 308 may determine one or more routes to the destination point. The best routes may be determined according to various criteria, such as fuel efficiency, toll avoidance, regenerative charging, and so on and so forth. In various embodiments, the user selects a destination location on the vehicle's maps interface. The electrical advisory algorithm may then calculate the route distance, utilizing previous driving history (e.g., average mileage and speed etc.) data. The electrical advisory algorithm may calculate and advise the user with current available charging and show whether the vehicle can reach the destination or not.

In various embodiments, TAA 308 provides the best route(s) to ERA 306. In various embodiments, each of the routes provided to the ERA 306 are analyzed for elevation points. ERA 306 may verify elevation points for each route. The best charging routes may be detected based on the elevation points. ERA 306 may determine the best charging routes. The best regenerative charging route may be determined based at least in part on the elevation points and determining how much regenerative charging can be performed, which may also take into account an individual driver's habits.

TAA 308 may provide the best regenerative charging route to TAA 308. TAA 308 may determine the best stopping points. In various embodiments, TAA 308 detects multiple stopping points and best energy saving route(s) and also provides updates to the ERA 306.

In various embodiments, ERA 306 provides the best regenerative charging route to the ECAA 310. ECAA 310 may monitor the charging availability (e.g., every second) and calculate the distance the vehicle can travel. Due to driving pattern changes, if a vehicle can no longer reach the destination, the ECAA 310 will notify the driver of such change. ECAA 310 may provide routing information to the HMI 318 to display the best route, display information regarding the regenerative charging status of the vehicle, and so on and so forth.

Position 316 may determine the GPS coordinates of the vehicle and provide geolocation information in the form of latitude, longitude, and elevation to ECAA 310, TAA 308, and ERA 306. While driving, if the vehicle is on the energy regenerative route, the ERA 306 will monitor and/or identify elevation locations from the selected maps using the vehicle GPS current position and vehicle IMU sensor data and will alert EC-battery and motor system 312 to swap the motor direction to start regenerating energy.

EC-battery and motor system 312 will swap directions and the vehicle will start charging (energy regeneration) until the user accelerates the vehicle. When the user 302 presses the accelerator, EC-battery and motor system 312 will change the motor direction and accelerate. In various embodiments, HMI 318 will display how much energy was regenerated.

Figure 4:
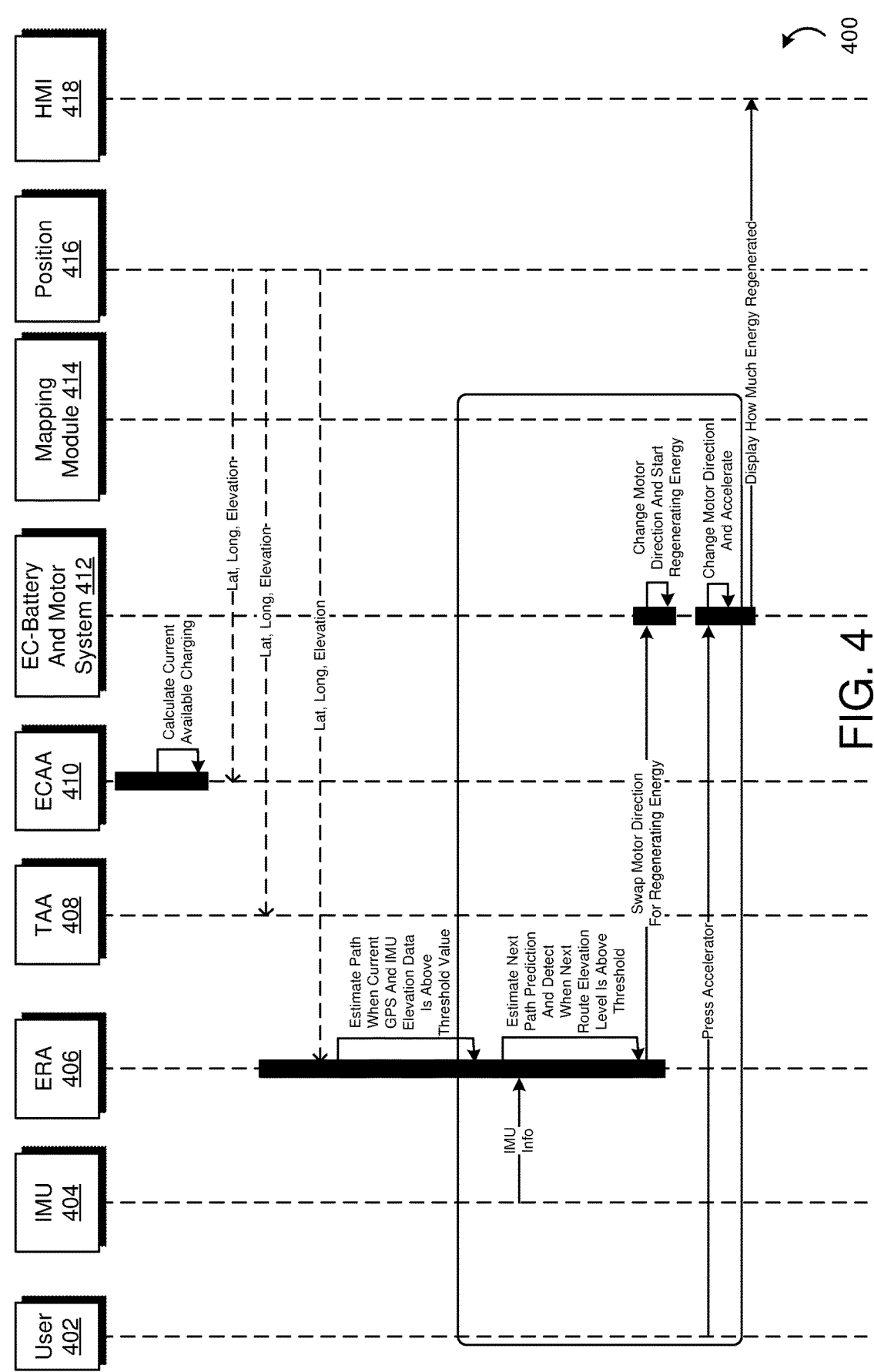
FIG. 4 depicts a diagram in which a vehicle predicts and applies regenerative braking in the absence of a known path, according to at least one embodiment of the present disclosure.

FIG. 4 depicts a diagram 400 in which a vehicle predicts and applies regenerative braking in the absence of a known path, according to at least one embodiment of the present disclosure. This may arise in cases where the vehicle is being driven while by a user without the aid of navigation software (e.g., mapping module).

FIG. 4 depicts an example embodiment comprising a user 402, IMU 404 (inertial measurement unit), ERA 406 (energy regenerative algorithm), TAA 408 (trip advisory algorithm), ECAA 410 (electrical advisory algorithm), EC-battery and motor system 412, mapping module 414, position 416, and HMI 418 (human-machine interface).

In various embodiments, user 402 drivers a vehicle where the destination has not been indicated. For example, the user 402 may be driving the vehicle without having inputted a destination location but nevertheless has a destination in mind. ECAA 410 may monitor the charging availability for the vehicle. The current available charging may be monitored every second and the distance the vehicle can travel is calculated. The current available charging may be presented to user 402 via HMI 418.

In various embodiments, position 416 will determine the GPS coordinates of the vehicle and provide latitude, longitude, and elevation information to ECAA 410, TAA 408, and ERA 406. In various embodiments, ERA 406 also receives IMU information from IMU 404. In various embodiments, ERA 406 will determine an estimate path when current GPS and IMU elevation data is above a threshold value. Once the vehicle reaches the elevation point in the predicted path, ERA 406 will estimate the next path prediction. If the elevation path is above the threshold value, then the ERA 406 will send a signal to the EC-battery and motor system 412 to swap the motor direction to regenerate the energy.

In various embodiments, ERA 406 determines the next path prediction and detects when the next route elevation is above a threshold. Position 416 continue to determine the GPS coordinates of the vehicle and provide geolocation information in the form of latitude, longitude, and elevation to ECAA 410, TAA 408, and ERA 406. While driving, if the vehicle is on the energy regenerative route, the ERA 406 will monitor and/or identify elevation locations from the selected maps using the vehicle GPS current position and vehicle IMU sensor data and will alert EC-battery and motor system 412 to swap the motor direction to start regenerating energy.

EC-battery and motor system 412 will swap directions and the vehicle will start charging (energy regeneration) until the user accelerates the vehicle. When the user 402 presses the accelerator, EC-battery and motor system 412 will change the motor direction and accelerate. In various embodiments, HMI 418 will display how much energy was regenerated.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cable box, a wearable smart device, cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a wearable smart device, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, DOCSIS, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000,single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A vehicle, comprising:
   one or more processors coupled to one or more memories that store computer-readable instructions that, when executed by the one or more processors, cause the one or more processors to:
   determine a destination selected by a user of the vehicle;
   determine, based on the destination, one or more candidate routes;
   select, from the one or more candidate routes, a first regenerative charging route, based on a first elevation point associated with the first regenerative charging route;
   determine, using GPS (global positioning system) and IMU (inertial measurement unit) information, that the vehicle has reached the first elevation point on the first regenerative charging route;
   determine that a second elevation point associated with a second regenerative charging route among the one or more candidate routes is above a threshold value;
   swap direction of a motor of the vehicle to initiate regenerative charging of a battery of the vehicle; and
   determine, prior to swapping the direction of the motor, that an accelerator pedal of the vehicle is not engaged.

2. The vehicle of claim 1, wherein the one or more processors are further configured to:
   determine, based on the first regenerative charging route, one or more stopping points.

3. The vehicle of claim 1, wherein the one or more processors are further configured to:
   determine that the user has pressed an accelerator pedal of the vehicle; and
   swap the direction of the motor of the vehicle to initiate acceleration of the vehicle.

4. The vehicle of claim 1, wherein the one or more processors are further configured to display how much energy was generated on a HMI (human-machine interface) of the vehicle.

5. The vehicle of claim 1, wherein the regenerative charging of the battery is initiated independent of the user engaging a brake pedal of the vehicle.

6. The vehicle of claim 1, wherein the one or more processors are further configured to upload at least one of the first regenerative charging route or the second regenerative charging route to a remote server.

7. A method, comprising:
   determining, by one or more processors of a vehicle, a destination selected by a user of the vehicle;
   determining, by the one or more processors of the vehicle, based on the destination, one or more candidate routes;
   selecting, by the one or more processors of the vehicle, from the one or more candidate routes, a first regenerative charging route, based on a first elevation point associated with the first regenerative charging route;
   determining, by the one or more processors of the vehicle, using GPS (global positioning system) and IMU (inertial measurement unit) information that the vehicle has reached the first elevation point on the first regenerative charging route;
   determining, by the one or more processors of the vehicle, that a second elevation point associated with a second regenerative charging route among the one or more candidate routes is above a threshold value;
   providing, by the one or more processors of the vehicle, instructions to swap direction of a motor of the vehicle to initiate regenerative charging of a battery of the vehicle; and
   determining, by the one or more processors of the vehicle, prior to swapping the direction of the motor, that an accelerator pedal of the vehicle is not engaged.

8. The method of claim 7, further comprising:
   determining, by the one or more processors of the vehicle, based on the first regenerative charging route, one or more stopping points.

9. The method of claim 7, further comprising:

determining, by the one or more processors of the vehicle, that the user has pressed an accelerator pedal of the vehicle; and providing, by the one or more processors of the vehicle, instructions to swap the direction of the motor of the vehicle to initiate acceleration of the vehicle.

10. The method of claim 7, further comprising displaying, by the one or more processors of the vehicle, how much energy was generated on a HMI (human-machine interface) of the vehicle.

11. The method of claim 7, wherein the regenerative charging of the battery is initiated independent of the user engaging a brake pedal of the vehicle.

12. The method of claim 7, further comprising calculating, by the one or more processors of the vehicle, charging percentage of the vehicle on the first regenerative charging route.

13. A vehicle, comprising:

one or more processors coupled to one or more memories that store computer-readable instructions that, when executed by the one or more processors, cause the one or more processors to:

determine, using GPS (global positioning system) and IMU (inertial measurement unit) information, that the vehicle has reached a first elevation point on a first driving route;

determine, using a path estimation algorithm a next driving route for the vehicle;

determine that a second elevation point on a second driving route is above a threshold value;

swap direction of a motor of the vehicle to initiate regenerative charging of a battery of the vehicle; and determine, prior to swapping the direction of the motor, that an accelerator pedal of the vehicle is not engaged.

14. The vehicle of claim 13, wherein the one or more processors are further configured to:

determine that a user has pressed an accelerator pedal of the vehicle; and swap the direction of the motor of the vehicle to initiate acceleration of the vehicle.

15. The vehicle of claim 13, wherein the regenerative charging of the battery is initiated independent of a user engaging a brake pedal of the vehicle.

16. The vehicle of claim 13, wherein the one or more processors are further configured to display how much energy was generated on a HMI (human-machine interface) of the vehicle.

17. The vehicle of claim 13, wherein the one or more processors are further configured to:

record charging data on the first driving route; and upload the charging data to a remote server.

\* \* \* \* \*